US006855911B1

(12) United States Patent
Lai

(10) Patent No.: US 6,855,911 B1
(45) Date of Patent: Feb. 15, 2005

(54) PIVOTABLE COVER FOR LASER CUTTING MACHINE

(75) Inventor: Jin-Sheng Lai, Hsi Chih (TW)

(73) Assignee: Great Computer Corporation, Taipei Hsien (TW)

( * ) Notice: Subject to any disclaimer, the term of this patent is extended or adjusted under 35 U.S.C. 154(b) by 0 days.

(21) Appl. No.: 10/885,794

(22) Filed: Jul. 8, 2004

(51) Int. Cl.[7] .......................... B23K 26/03; B23K 26/12
(52) U.S. Cl. .................................. 219/121.86; 219/522
(58) Field of Search ............ 219/121.6, 121.63–121.72, 219/121.86, 520, 522

(56) References Cited

U.S. PATENT DOCUMENTS 4,985,780 A * 1/1991 Garnier et al. ......... 219/121.68
5,183,993 A * 2/1993 Sato et al. ............. 219/121.82
5,591,361 A * 1/1997 Hostler et al. ......... 219/121.82

* cited by examiner

*Primary Examiner*—Samuel M. Heinrich
(74) *Attorney, Agent, or Firm*—Dennison, Schultz, Dougherty & MacDonald

(57) ABSTRACT

A laser cutting machine includes a cover which is pivotably connected to a side of the base of the machine. Two supports are connected between the cover and the base so as to maintain the open status of the cover. Two hand access recesses are defined in the rear end of the cover which can be pivoted upward by only one person such that maintenance can be proceeded easily and large objects conveniently access the work top surface.

3 Claims, 6 Drawing Sheets

25
12
13
2
11
21
1
3

PIVOTABLE COVER FOR LASER CUTTING MACHINE

FIELD OF THE INVENTION

The present invention relates to a cover of a laser cutting machine and the cover can be easily opened by only one person so as to access and maintain the machine.

BACKGROUND OF THE INVENTION

A conventional laser cutting machine is disclosed in FIG. 6, and generally includes a base with a top surface and a laser head driven by a polarized shaft is connected to the top surface. A cover is securely mounted on the top of the base by extending screws through sidewalls of the cover and connected to the base. The cover is made of metal boards and a transparent window is embedded in the cover. The cover is 30 kilograms in weight and all the wires connected to the panel on the cover have to be extended from an inside of the cover so as to be connected to the base. Once the machine requires maintenance, all the screws are unscrewed and the wires are disconnected from the base, two persons are required to remove the heavy cover from the base so that the maintenance can be proceeded. After the maintenance is done, the cover is lifted and installed to the base and the wires are connected to the base again. This is time consuming.

The transparent window in the cover is made to be as large as possible so that the range of movement of the laser head can be observed via the window. Nevertheless, when the object to be machined is a large one, the arrangement of the cover makes the positioning of the object difficult and inconvenient.

SUMMARY OF THE INVENTION

The object of the present invention is to provide a cover which can be opened by only one person so that the maintenance becomes convenient and easy. For a large object, the easily opened cover allows the large object to be positioned on the laser cutting machine.

In order to achieve the object of the present invention, the cover of the laser cutting machine of the present invention is pivotably connected to a side of the base and two support rods are pivotably connected between the base and the cover. The cover includes two hand access recesses so that the user may conveniently pivot the cover upward. A large object can also be conveniently positioned on the top of the base.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
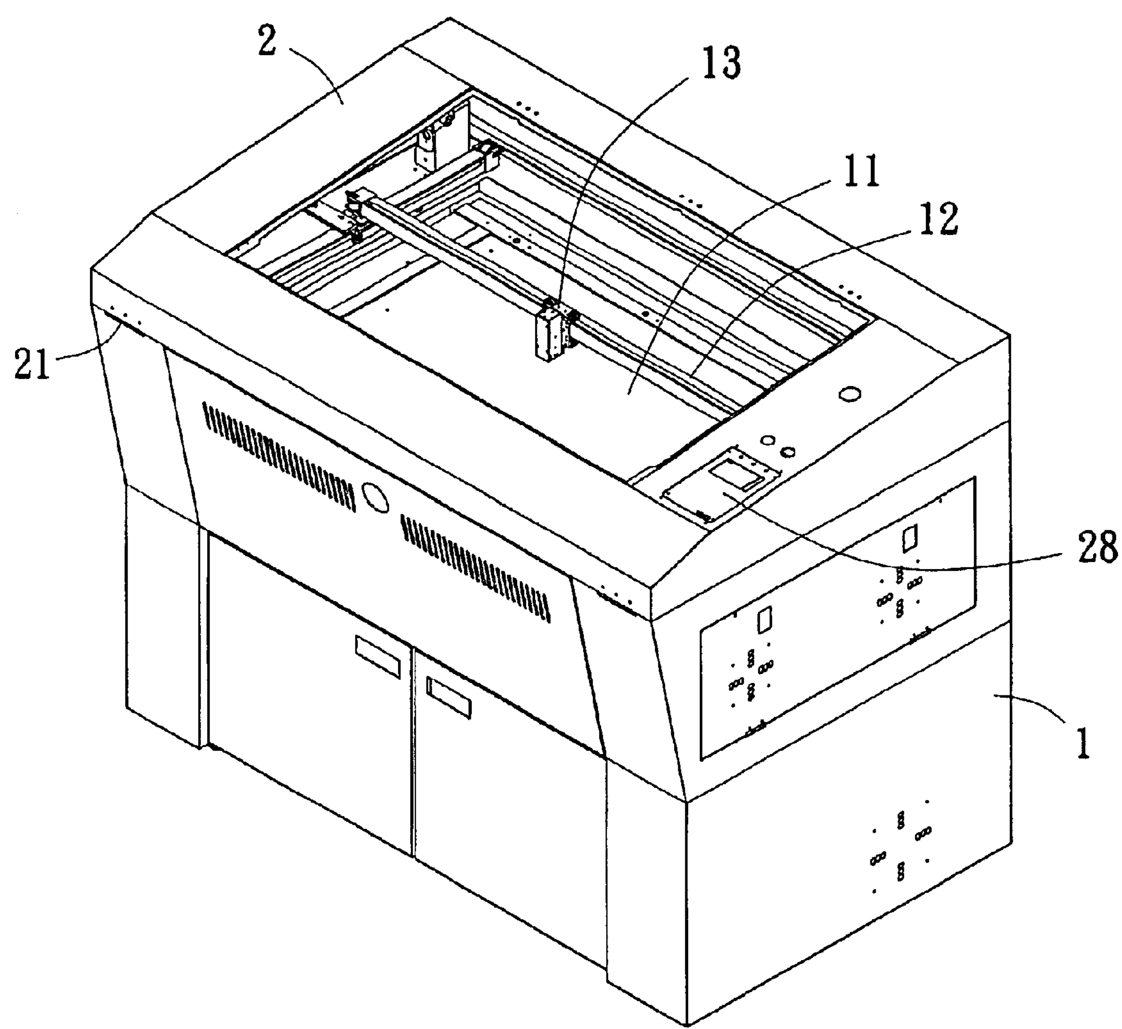
FIG. 1 is a perspective view to show the laser cutting machine with the cover of the present invention.
Figure 2:
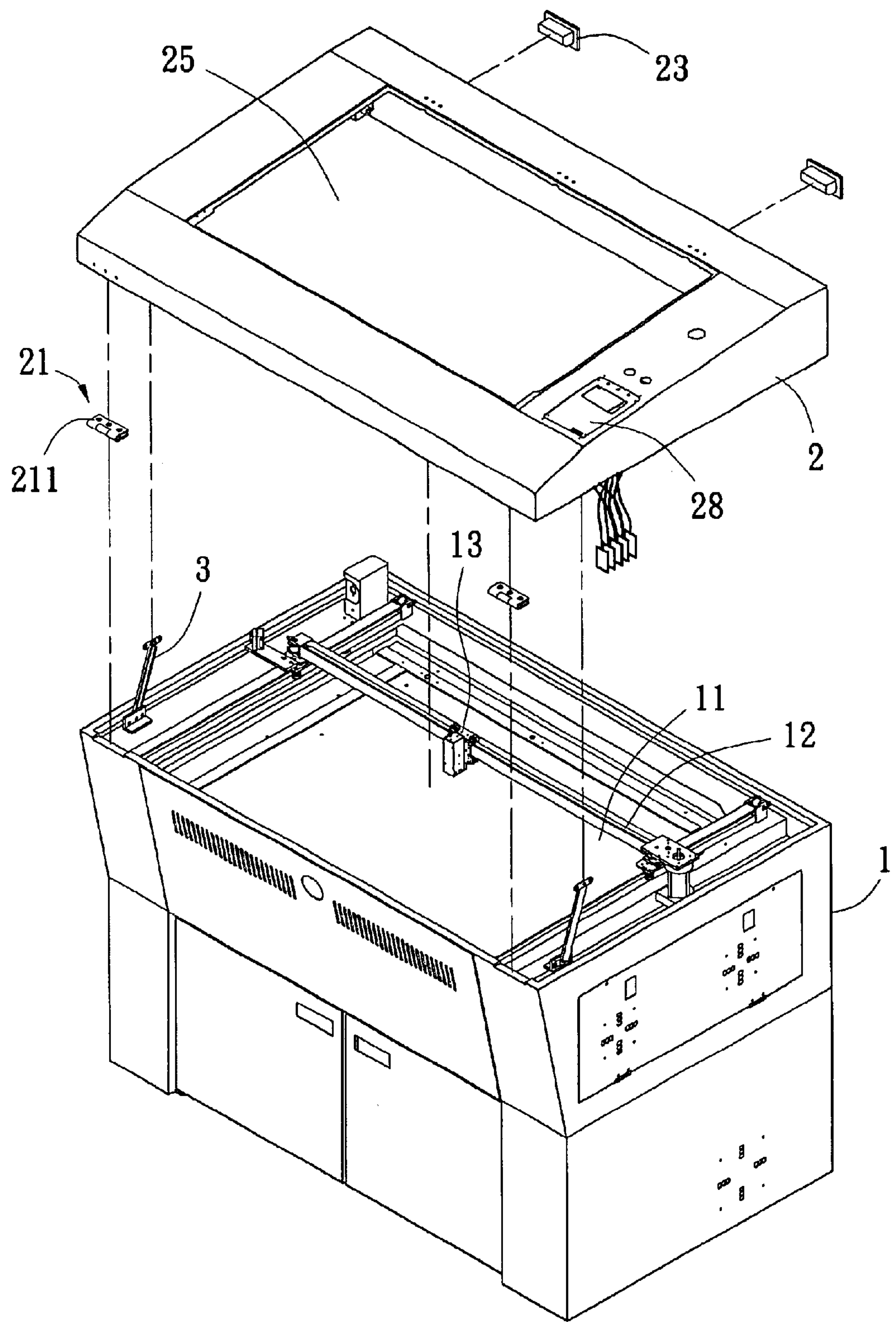
FIG. 2 is an exploded view to show the laser cutting machine with the cover of the present invention.
Figure 3:
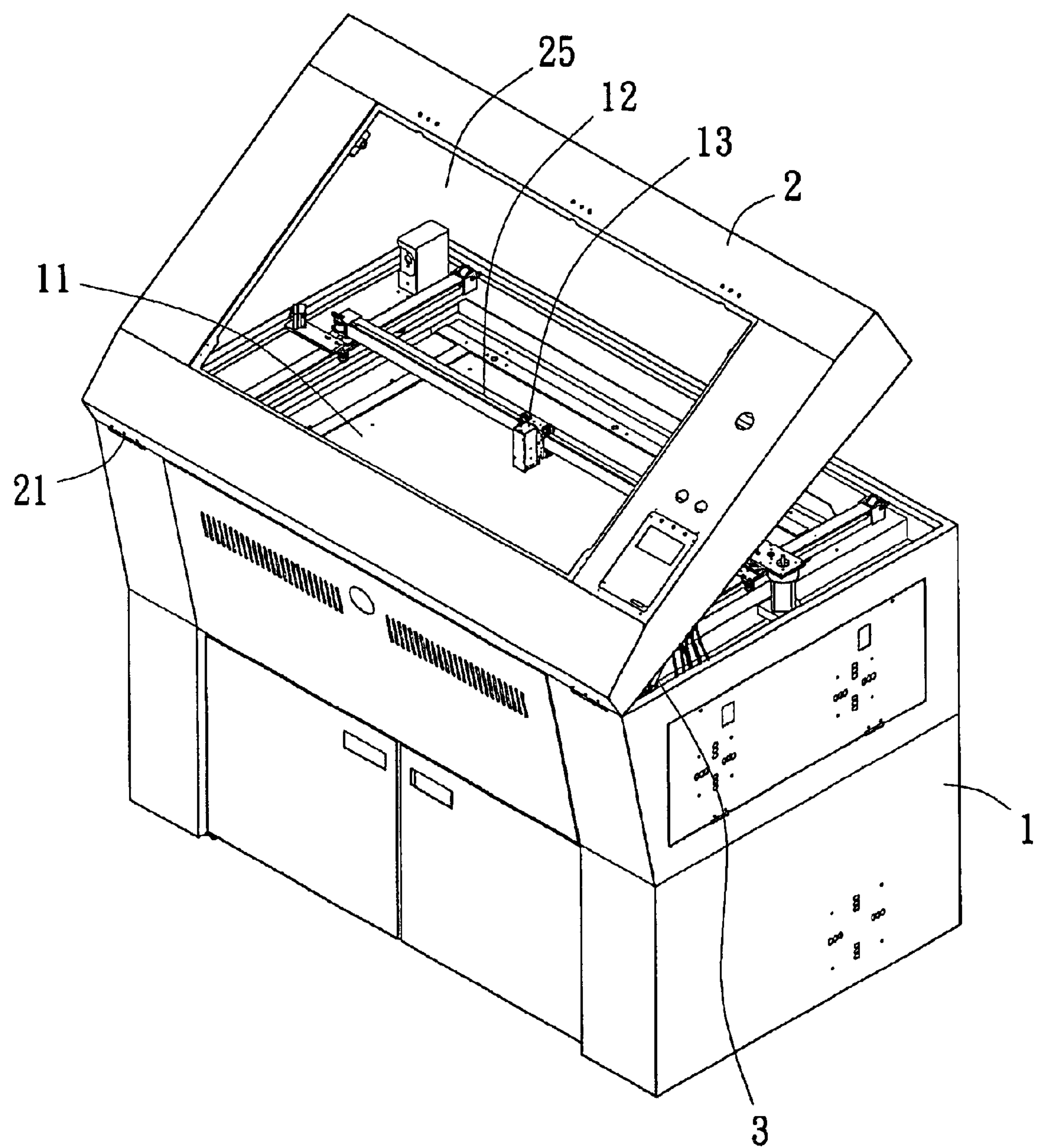
FIG. 3 shows the cover is opened and supported by the two support rods.
Figure 4:
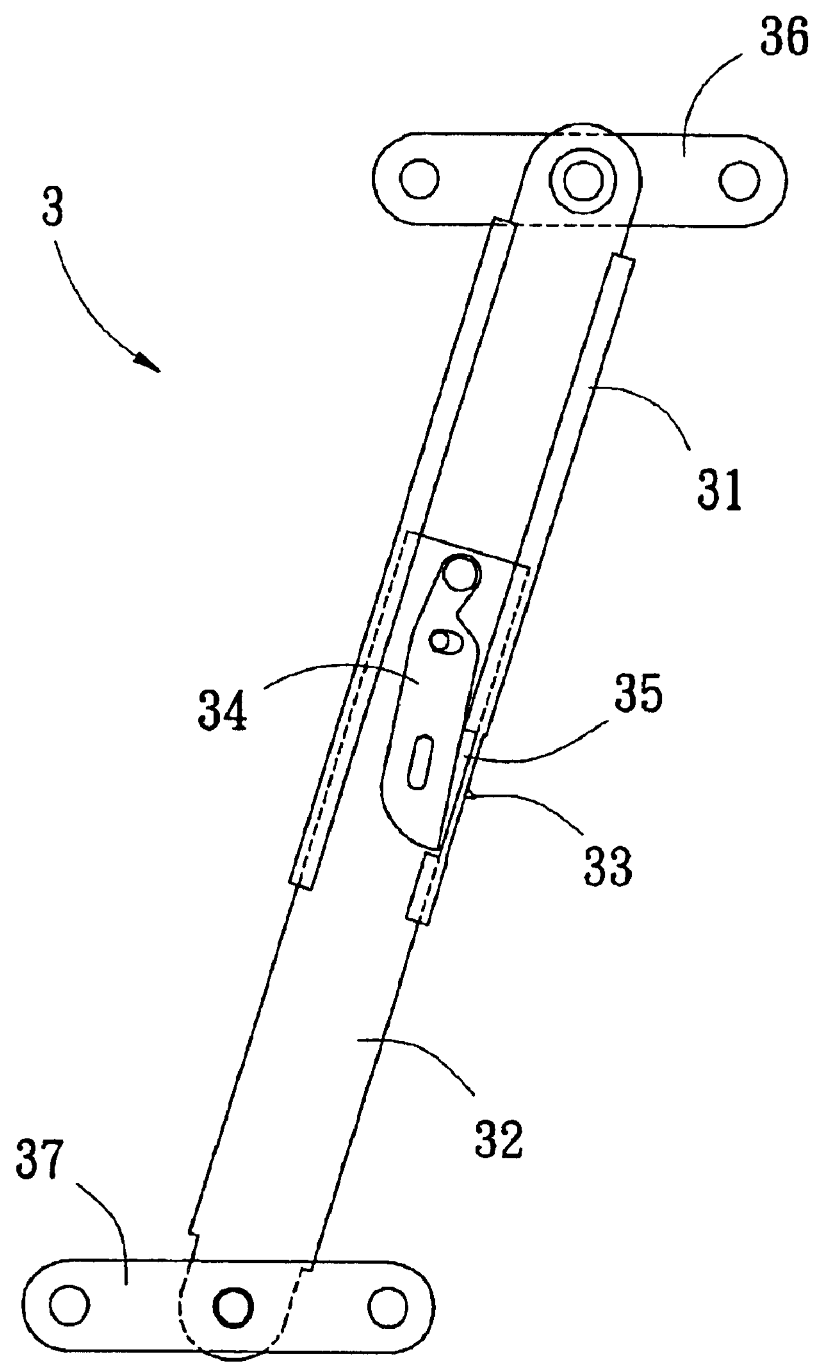
FIG. 4 shows the structure of the support rod.
Figure 5:
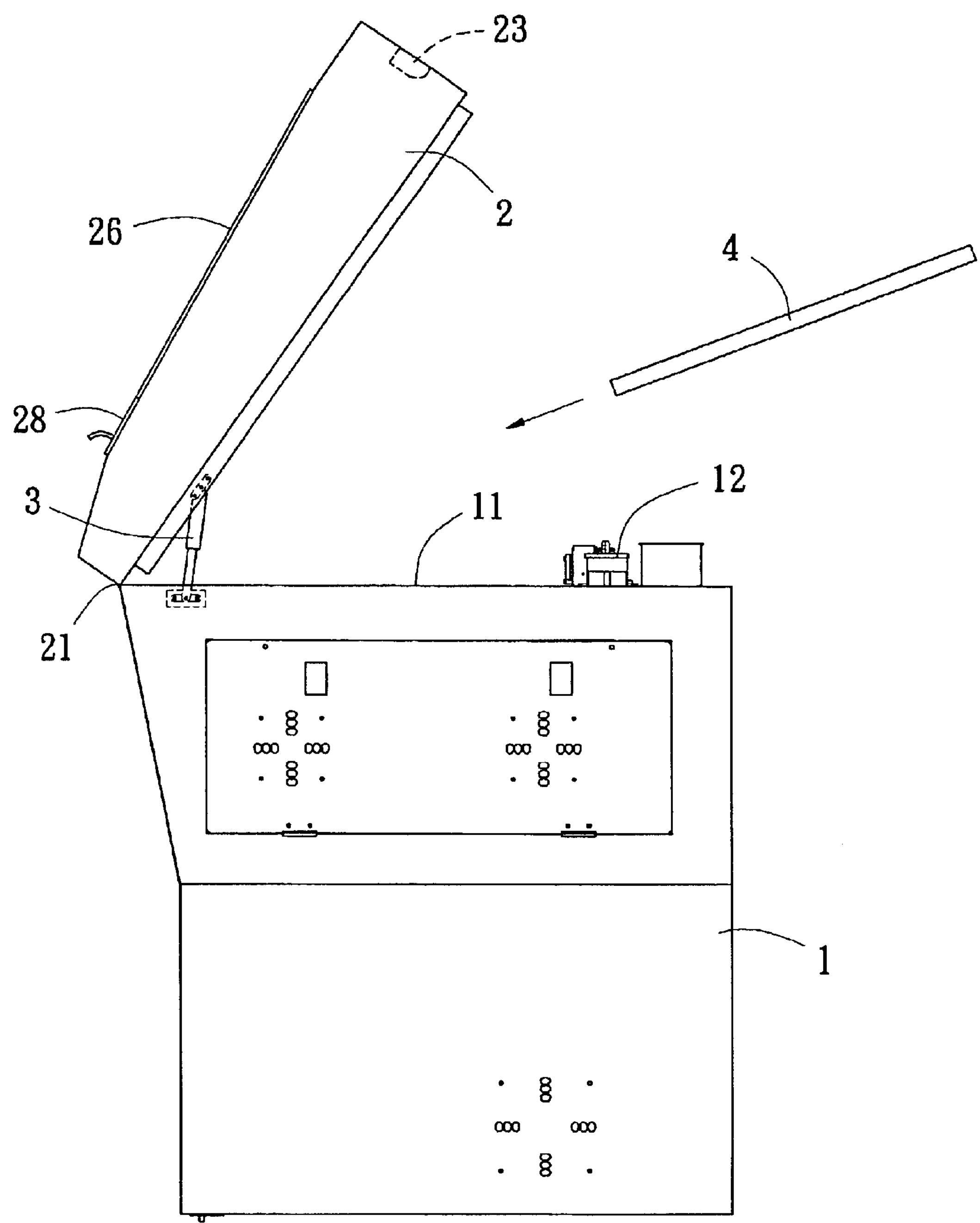
FIG. 5 is a side view to show a large object is to be put on the top surface of the base.
Figure 6:
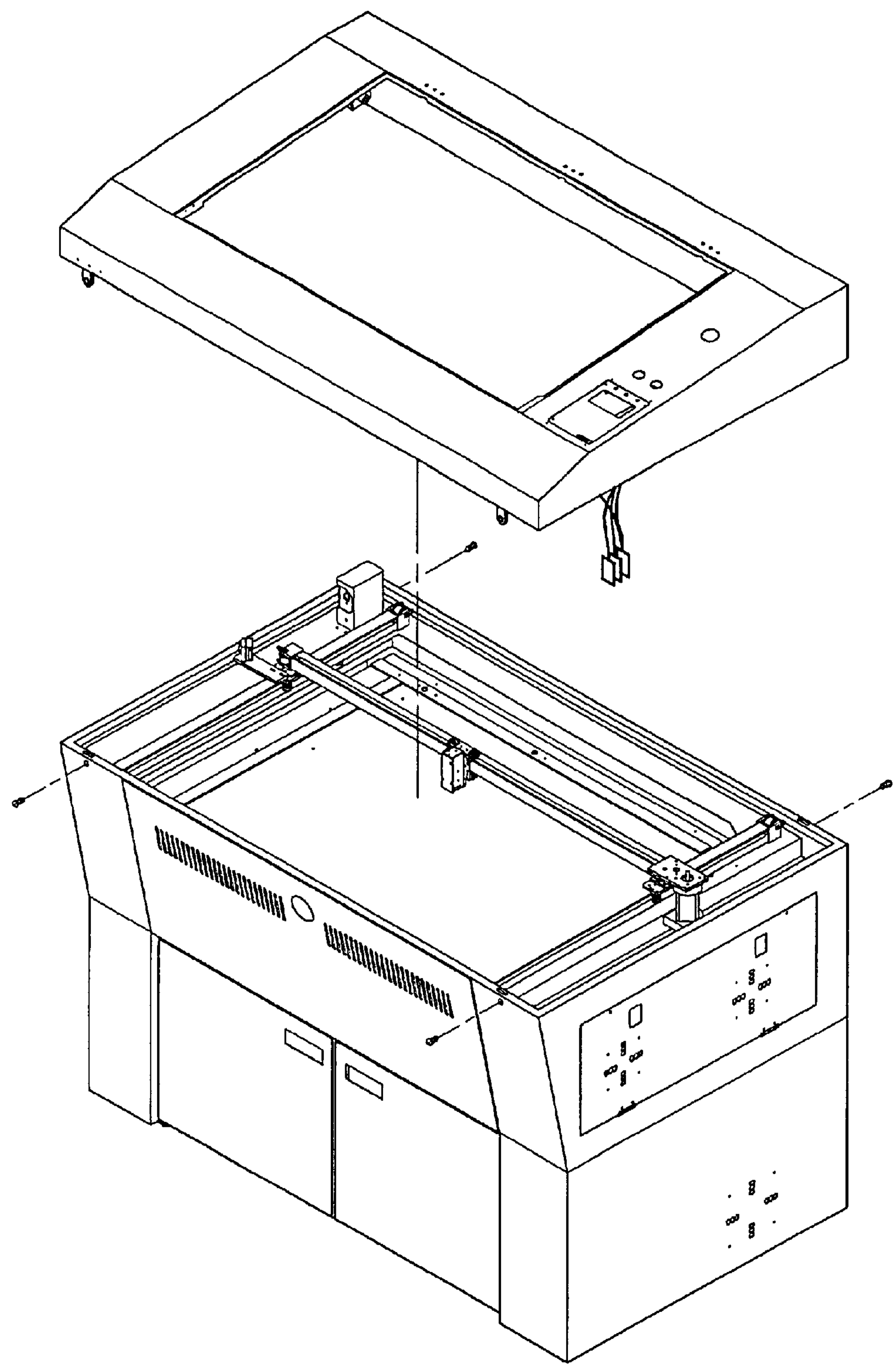
FIG. 6 is an exploded view to show the conventional cover and the laser cutting machine.

Referring to FIGS. 1 to 5, the laser cutting machine of the present invention comprises a base 1 which has a work top surface 11 and a polarized shaft 12 is connected on the work top surface 11 so as to drive a laser head 13 to move along the shaft 12. A cover 2 is mounted on the work top surface 11.

A plurality of hinges 21 are connected to a front end of the cover 2 and a side of the base 1. Two access recesses 23 are defined in a rear end of the cover 2 and two support rods 3 are connected between the base 1 and the cover 2.

The cover 2 is a rectangular cover 2 made of metal boards which include rounded corners. Each of the hinges 21 includes a leaf 211 which is connected to the front end of the cover 2, and a stepped surface is defined opposite to the leaf 211 so as to be connected to the base 1. Screws (not shown) may further be used to lock the hinges 21 to the base 1. A window 25 is defined through the cover 2 and a transparent lid 26 (FIG. 5) is engaged with the window 25. A panel 28 is connected to a surface on a side of the cover 2 and wires extend from an underside of the panel 28 and are connected to the base 1.

Each support rod 3 is composed of first and second C-shaped rails 31, 32 and the two C-shaped rails 31, 32 are pivotably connected with each other. A ratchet mechanism 33 connected between the first and second C-shaped rails 31, 32 such that the two C-shaped rails 31, 32 can be engaged with each other or pivoted with each other. A notch 35 is defined in the first C-shaped rail 31 and a stop plate 34 is connected to the second C-shaped rail 32 so as to be engaged with the notch 35. Each of the first and second C-shaped rails 31, 32 has a connection plate 36, 37 so as to be respectively connected to the cover 2 and the base 1. The support rods 3 are located at two sides of the base 1 and close to the front end of the cover 2 so that the cover 2 can be opened as wide as possible such as 40 to 80 degrees relative to the work top surface 11 of the base 1. By the wide opening of the cover 2, a large object 4 can be conveniently positioned on the work top surface 11 of the base 1.

When the laser cutting machine needs maintenance, the user simply opens the cover 2 by using the hand access recesses 23 and locks the position of the open status of the cover 2 by the two support rods 3. After maintenance, the support rods 3 are collapsed and the cover 2 is closed again. Again, the large object can be moved via the opened space between the cover 2 and the base 1 and this saves a lot of time.

While we have shown and described the embodiment in accordance with the present invention, it should be clear to those skilled in the art that further embodiments may be made without departing from the scope of the present invention.

What is claimed is:

1. A laser cutting machine comprising:

a base (1) having a work top surface (11) and a shaft (12) connected on the work top surface (11), a laser head (13) movably connected to a shaft (12);

a rectangular cover (2) made of metal boards and including rounded corners, a plurality of hinges (21) connected to a front end of the cover (2) and a side of the base (1), a window (25) defined through the cover (2) and a transparent lid (26) engaged with the window (25), a panel (28) connected to a surface of the cover (2) and wires extending from an underside of the panel and connected to the base (1), two access recesses (23) defined in a rear end of the cover (2), and two support rods (3) connected between the base (1) and the cover (2).

2. The machine as claimed in claim 1, wherein the cover (2) is opened to 40 to 80 degrees relative to the work top surface (11) of the base (1).

3. The machine as claimed in claim 1, wherein each support rod (3) is composed of first and second C-shaped rails (31, 32) and a ratchet mechanism (33) connected between the first and second C-shaped rails (31, 32), a notch (35) defined in the first C-shaped rail (31) and a stop plate (34) connected to the second C-shaped rail (32) so as to be engaged with the notch (35), each of the first and second C-shaped rails (31, 32) having a connection plate (36, 37) so as to be respectively connected to the cover (2) and the base (1).

* * * * *